યunited States Patent Office  3,504,006
Patented Mar. 31, 1970

3,504,006
PROCESS FOR PREPARING 1,3,5,7-TETRAMETHYL-1,3,5,7-TETRAHYDROCYCLOTETRASILOXANE
Frank J. Modic, Scotia, N.Y., assignor to General Electric Company, a corporation of New York
No Drawing. Filed July 29, 1964, Ser. No. 386,049
Int. Cl. C07d 103/04
U.S. Cl. 260—448.2   1 Claim

ABSTRACT OF THE DISCLOSURE

The compound 1,3,5,7 - tetramethyl - 1,3,5,7-tetrahydroxycyclotetrasiloxane which is useful as a cross-linking agent for silicone compositions is prepared by reacting 1,3,5,7-tetramethyl-1,3,5,7 - tetrahydrocyclotetrasiloxane with water in contact with a platinum catalyst.

---

The present invention is directed to novel cyclic polysiloxanes. More particularly, the present invention is directed to the cyclotetrasiloxane - 1,3,5,7 - tetramethyl-1,3,5,7 - tetrahydroxycyclotetrasiloxane having the formula:

(1)

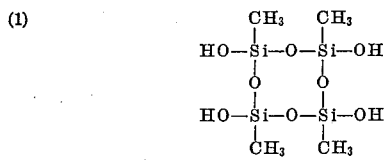

The above cyclotetrasiloxane, which will sometimes hereinafter be referred to for the sake of brevity as "methyl hydroxy tetramer" is prepared by effecting reaction between 1,3,5,7 - tetramethylcyclotetrasiloxane having the formula, (2)

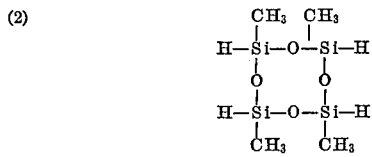

and water in the presence of a suitable solvent and in the presence of a platinum or platinum-containing catalyst.

The existence of the methyl hydroxy tetramer as a stable compound is completely unexpected and unpredictable, since the tetramer is composed entirely of trifunctional methyl siloxane units which would be expected to exist only as a highly condensed gel.

The methyl hydroxy tetramer of Formula 1 has many uses resulting from the high proportion of silicon-bonded hydroxyl groups attached to the cyclotetrasiloxane ring. As is well known in the organopolysiloxane art, one convenient method of making organopolysiloxanes is by forming crosslinks between various molecules. In general, these crosslinks are obtained by condensing a silicon-bonded hydroxyl group of one molecule with a silicon-bonded hydroxyl group of another molecule, either in the presence or absence of a suitable condensation catalyst, to provide a larger crosslinked molecule. One particularly valuable use of the compounds of Formula 1 is as a crosslinking agent for silicone compositions. In particular, the methyl hydroxy tetramer of Formula 1 can be mixed with linear, fluid silanol chain-stopped diorganopolysiloxanes, such as dimethylpolysiloxanes, to form products which cure, especially in the presence of condensation catalysts such as tin octoate or dibutyltin dilaurate, to the elastic state.

As previously mentioned, the methyl hydroxy tetramer of Formula 1 is prepared by effecting reaction between 1,3,5,7 - tetramethylcyclotetrasiloxane and water in the presence of solvent and catalyst. While the proportions of the various ingredients employed in preparing the methyl hydroxy tetramer can vary within wide limits, it is found that satisfactory results are obtained when the water and cyclotetrasiloxane starting material are present in the amount of about 4 moles of water per mole of the starting cyclotetrasiloxane. This provides one molecule of water for each silicon-bonded hydrogen atom in the starting material. When other than the amount of water set forth above is employed, it is preferred that the water be present in a slight excess such as from about 4.1 to 5 moles of water per mole of the 1,3,5,7-tetramethylcyclotetrasiloxane.

The amount of solvent employed in the reaction is only that amount necessary to form a solution of the reaction mixture and the reaction products. Generally a polar solvent is employed such as acetone, tetrahydrofuran, or dioxane. The solvent is generally employed in the amount of from about 100 parts to 300 parts by weight per 100 parts of the tetramethylcyclotetrasiloxane starting material.

The amount and type of catalyst employed for facilitating the reaction can vary within extremely wide limits. In general, the preferred type of catalysts are those involving platinum compounds and complexes. These compounds are much more effective for the reaction than the elemental platinum catalysts such as the type described in Patent 2,970,150—Bailey, although the catalysts of the Bailey patent do have some limited utility in preparing the methyl hydroxy tetramer. Of more interest as catalysts are materials such as chloroplatinic acid and various complexes prepared by reacting various platinum chlorides with alcohols, aldehydes, ethers, olefins and the like. While the amount of catalyst can vary within wide limits it is preferred to provide sufficient catalyst to provide from 10 to 1,000 parts of platinum per million parts, by weight, of the starting tetramethylcyclotetrasiloxane.

The reaction is effected by maintaining the reaction mixture, either by the addition of external heat or by controlling the rate of addition of the various reactants, at a temperature of from about 50 to 100° C. for the time required to complete the reaction, which is from about 1 to 5 or more hours. An especially convenient method of affecting the reaction is to form a reaction mixture of the tetramethylcyclotetrasiloxane, the water, and the solvent and then slowly add the platinum catalyst to the reaction mixture.

After the reaction is completed, the methyl hydroxy tetramer is separated from the reaction mixture by any suitable means such as, for example, by forming an aqueous layer and an organic layer by the addition of a saturated aqueous sodium chloride solution and diethyl-ether to the reaction mixture, and then separating the ether layer which contains the desired product and evaporating the solvent.

The following examples are illustrative of the practice of the present invention and are not intended for purposes of limitation.

EXAMPLE 1

The catalyst employed in the present invention was a platinum-ethylene complex prepared by dissolving 25 parts of $K_2PtCl_4$ in 130 parts of 4% aqueous hydrochloric acid in a pressure vessel. After flushing the vessel with nitrogen it was connected to a source of ethylene and subjected to a continuous ethylene pressure of about 45 p.s.i. for 36 hours. The reaction mixture was then placed in a vacuum desiccator containing sulphuric acid and potassium hydroxide pellets and maintained under vacuum to evaporate the solvent. The resulting crystals were then dissolved in 4% alcoholic hydrochloric acid and undissolved material was removed by filtration. The filtrate was then pumped under vacuum at room temperature to remove all liquids. The resulting platinum-ethylene complex was a yellow powder having the formula, (3)     $(PtCl_2 \cdot C_2H_4)_2$ To a dropping funnel was added 500 grams of dioxane and 1.0 gram of the platinum-ethylene complex. The resulting slurry was agitated and slowly added over a period of 1.25 hours to a reaction vessel containing 120 grams of 1,3,5,7-tetramethylcyclotetrasiloxane, 39.6 grams distilled water, and 150 grams dioxane. The rate of addition was controlled so that the total amount of platinmum added was 0.01 grams. During the reaction the temperature of the reaction mixture rose to about 80° C., and hydrogen was evolved. By the end of the addition, hydrogen evolution had ceased. At this time 200 grams of a saturated solution of sodium chloride in water was added to the reaction mixture. Subsequently, 150 grams of diethylether was added and the reaction mixture was stirred for 10 minutes. This resulted in an upper ether dioxane layer and a lower-water-dioxane layer. The ether-dioxane layer was separated and the ether and the dioxane were evaporated to produce crude 1,3,5,7-tetramethyl-1,3,5,7-tetrahydroxy-cyclotetrasiloxane. The crude product was recrystallized from diethylether and washed with hexane to produce the pure methyl hydroxy tetramer, which was a white amorphous solid melting at 80–82° C. The identity of the product was confirmed by infrared analysis, which showed a peak at 9.2 microns corresponding to the cyclotetrasiloxane ring, peaks at 3.1, 10.9, and 11.2 microns corresponding to the silanol groups. The absence of a peak in the range of 4.4 to 4.8 microns showed the absence of silicon-hydrogen linkages and the absence of a peak at 9.5 microns showed the substantial absence of any condensation product of the desired methyl hydroxy tetramer. The product was insoluble in benzene, hexane, methylene chloride, and carbon sulfide, somewhat soluble in water, diethylether and acetone, and readily soluble in pyridine.

EXAMPLE 2

This example illustrates the preparation of an elastomeric polysiloxane employing the methyl hydroxy tetramer of Example 1. To 100 grams of a silanol chain-stopped dimethylpolysiloxane having a viscosity of 5,000 centistokes at 25° C. is added 5 parts of the methyl hydroxy tetramer of Example 1, 10 parts of finely divided silica, 30 parts zinc oxide, 25 parts calcined clay and 3 parts dibutyltin dilaurate. This material is then heated at 50° C. for one hour, during which time the material is converted to a solid elastic silicon rubber, which is useful in shock mounts, in joints between sections of highway to compensate for expansion and contraction of the highway. In addition, this cured silicone rubber is useful as an encapsulating material for electrical components to reduce shock and in many gasket applications.

What I claim as new and desired to secure by Letters Patent of the United States is:

1. The process for preparing the cyclic composition of the formula:

$$\underset{|}{\overset{OH}{(MeSiO)_4}}$$

where Me is methyl, which comprises reacting
   (1) 1,3,5,7-tetramethyl-1,3,5,7-tetrahydrocyclo-tetrasiloxane with,
   (2) water in contact with
   (3) a platinum catalyst of formula $(PtCl_2 \cdot C_2H_4)_2$, whereby the SiH is converted into SiOH.

References Cited

UNITED STATES PATENTS 3,328,448     6/1967     Barnes et al. _____ 260—448.2

TOBIAS E. LEVOW, Primary Examiner

P. F. SHAVER, Assistant Examiner